(12) United States Patent
Jansen et al.

(10) Patent No.: US 11,295,424 B2
(45) Date of Patent: Apr. 5, 2022

(54) GENERATION OF ALPHA MASKS OF VIDEO FRAMES

(71) Applicant: Altostratus Capital LLC, Wilmington, DE (US)

(72) Inventors: Toke Jansen, Sunnyvale, CA (US); Jacob Schack Vestergaard, San Jose, CA (US)

(73) Assignee: ALTOSTRATUS CAPITAL LLC, Wilmington, DE (US)

( * ) Notice: Subject to any disclaimer, the term of this patent is extended or adjusted under 35 U.S.C. 154(b) by 39 days.

(21) Appl. No.: 16/492,271

(22) PCT Filed: Mar. 12, 2018

(86) PCT No.: PCT/US2018/021953
§ 371 (c)(1),
(2) Date: Sep. 9, 2019

(87) PCT Pub. No.: WO2018/169843
PCT Pub. Date: Sep. 20, 2018

(65) Prior Publication Data
US 2020/0082516 A1   Mar. 12, 2020

(30) Foreign Application Priority Data

Mar. 14, 2017   (EP) ..................... 17160753

(51) Int. Cl.
*G06T 5/20*   (2006.01)
*G06T 5/50*   (2006.01)
*G06T 3/40*   (2006.01)

(52) U.S. Cl.
CPC ................. *G06T 5/20* (2013.01); *G06T 3/40* (2013.01); *G06T 5/50* (2013.01); *G06T 2207/20016* (2013.01)

(58) Field of Classification Search
CPC .... G06T 3/40; G06T 5/20; G06T 5/50; G06T 2207/10016; G06T 2207/20016;
(Continued)

(56) References Cited

U.S. PATENT DOCUMENTS 8,078,002 B2 * 12/2011 Kang ...................... G06T 5/005
382/275
8,379,972 B1 * 2/2013 Wang ..................... H04N 5/272
382/162

(Continued)

OTHER PUBLICATIONS

He, et al., "Guided Image Filtering", IEEE Trans. on Pattern Analysis and Machine Intelligence, vol. 35, No. 6, Jun. 2013 (Year: 2013).*

(Continued)

*Primary Examiner* — Michael J Vanchy, Jr.
(74) *Attorney, Agent, or Firm* — Fernando & Partners, LLP

(57) ABSTRACT

Disclosed is an electronic device and a method to generate alpha masks of video frames in a video comprising a plurality of video frames including a first video frame and a second video frame following the first video frame, where the method comprising; obtaining a first alpha mask of the first video frame; providing a first downscaled video frame, wherein the first downscaled video frame is a lower resolution version of the first video frame; providing a first downscaled alpha mask of the first alpha mask; estimating a first primary coefficient and a first secondary coefficient based on the first downscaled video frame and the first downscaled alpha mask; and generating a second alpha mask for the second video frame based on the first primary coefficient and the first secondary coefficient.

20 Claims, 7 Drawing Sheets

(58) Field of Classification Search
CPC .............. G06T 2207/20092; G06T 7/11; G06T 2207/10024; G06T 2207/20028; G06T 2207/20182; G06T 5/005; G06T 7/194; G06T 7/269; H04N 5/275; H04N 5/272; H04N 9/11; H04N 9/75; H04N 9/76; G06K 9/00
See application file for complete search history.

(56) References Cited

U.S. PATENT DOCUMENTS

| | | | | |
|---|---|---|---|---|
| 2007/0116356 | A1* | 5/2007 | Gong | G06T 7/215 382/173 |
| 2011/0229053 | A1* | 9/2011 | Tezaur | G06T 7/13 382/266 |
| 2014/0003719 | A1 | 1/2014 | Bai et al. | |
| 2015/0189146 | A1* | 7/2015 | Venshtain | H04N 5/243 382/103 |
| 2017/0116481 | A1* | 4/2017 | Chen | G06K 9/6244 |
| 2017/0244908 | A1* | 8/2017 | Flack | G06K 9/00234 |
| 2018/0253865 | A1* | 9/2018 | Price | G06N 3/0454 |

OTHER PUBLICATIONS

Shum, et al., ACM Transactions on Graphics, vol. 23, No. 2, Apr. 2004 (Year: 2004).*
Levin A., et al., "A Closed-Form Solution to Natural Image Matting", IEEE Transactions on Patterns Analysis and Machine Intelligence, vol. 30, No. 2, Feb. 2008, pp. 228-242.
Zhen Tang et al., "Video Matting Via Opacity Propagation", The Visual Computer, International Journal of Computer Graphics, Springer, Berlin, DE, vol. 28, No. 1, Apr. 19, 2011,pp. 47-61.
Lee, S. Y. et al., "Temporally Coherent Video Matting", Graphical Models, Elsevier, vol. 72, No. 3, May 2010, pp. 25-33.
Written Opinion and International Search Report for PCTUS2018021953 dated May 22, 2018.
Extended European Search Report for EP17160753.4 dated Aug. 7, 2017.

* cited by examiner

GENERATION OF ALPHA MASKS OF VIDEO FRAMES

FIELD

The present disclosure relates to an electronic device and a method to generate alpha masks of video frames in a video comprising a plurality of video frames including a first video frame and a second video frame following the first video frame.

BACKGROUND

The article "A closed-form solution to natural image matting" by Levin, A., Lischinski, D., & Weiss, Y. (2008), in IEEE Transactions on Pattern Analysis and Machine Intelligence, 30(2), 228-42 discloses that interactive digital matting, the process of extracting a foreground object from an image based on limited user input, is an important task in image and video editing. From a computer vision perspective, this task is extremely challenging because it is massively ill-posed—at each pixel one must estimate the foreground and the background colors, as well as the foreground opacity ("alpha matte") from a single color measurement. Current approaches either restrict the estimation to a small part of the image, estimating foreground and background colors based on nearby pixels where they are known, or perform iterative nonlinear estimation by alternating foreground and background color estimation with alpha estimation. Presented in the article is a closed-form solution to natural image matting. A cost function is derived from local smoothness assumptions on foreground and background colors, and in the resulting expression it is possible to analytically eliminate the foreground and background colors to obtain a quadratic cost function in alpha. Hereby the globally optimal alpha matte is found by solving a sparse linear system of equations. Furthermore, the closed-form formula allows to predict the properties of the solution by analyzing the eigenvectors of a sparse matrix, closely related to matrices used in spectral image segmentation algorithms.

SUMMARY

There is a need for an improved method of generating alpha masks for video frames in a video.

Disclosed is a method to generate alpha masks of video frames in a video, where the video comprises a plurality of video frames including a first video frame and a second video frame following the first video frame. The method comprises obtaining a first alpha mask of the first video frame. The method comprises providing a first downscaled video frame, wherein the first downscaled video frame is a lower resolution version of the first video frame. The method comprises providing a first downscaled alpha mask of the first alpha mask. The method comprises estimating a first primary coefficient and a first secondary coefficient based on the first downscaled video frame and the first downscaled alpha mask. The method comprises generating a second alpha mask for the second video frame based on the first primary coefficient and the first secondary coefficient.

Disclosed is also an electronic device for generating alpha masks of video frames in a video. The electronic device comprises a camera configured to provide the video comprising a plurality of video frames including a first video frame and a second video frame following the first video frame. The electronic device comprises a display configured to display the video frames of the video. The electronic device comprises a processing unit. The processing unit is configured to obtain a first alpha mask of the first video frame. The processing unit is configured to provide a first downscaled video frame, wherein the first downscaled video frame is a lower resolution version of the first video frame. The processing unit is configured to provide a first downscaled alpha mask of the first alpha mask. The processing unit is configured to estimate a first primary coefficient and a first secondary coefficient based on the first downscaled video frame and the first downscaled alpha mask. The processing unit is configured to generate a second alpha mask for the second video frame based on the first primary coefficient and the first secondary coefficient.

The electronic device may be a smart phone, a smart tv, a computer, a pc, a tablet etc. The camera may be a camera in the electronic device, such as a camera in the smart phone. The display may be a display of the electronic device, such as a display of the smart phone. The processing unit may be a processing unit of the electronic device, such as a processing unit of the smart phone. Thus the smart phone may be configured for capturing the video comprising a plurality of video frames including a first video frame and a second video frame with the camera, for displaying the video on the display, and for processing the video frames to generate alpha masks for the video frames by the processing unit.

The method and electronic device as disclosed provide that alpha masks for video frames can be generated very fast, such that the video frames constantly coming from the camera, when a video is captured, can be shown on the display to the user in real time.

It is an advantage that the generation of the second alpha mask is faster than the camera frame rate, such that the video is shown on the display in real time, instantly, immediately.

The alpha masks can be generated fast enough for real time display, as the method provides that the processing of data can be performed fast since the calculations needed in the data processing are less complex and thus less time consuming than in prior art. The second alpha mask may be determined as an approximation.

Further the calculations may be performed in an improved way relative to prior art, and this further provides that the generation of alpha masks for consecutives video frames can be performed faster than in prior art.

It is an advantage that the method may be used for video matting by extrapolating the alpha mask of a video frame to the consecutive video frame.

It is an advantage that the coefficients, the first primary coefficient a, and the first secondary coefficient b, at a time $t=1$ can be estimated when the first alpha mask for a time $t=0$ is known. The second alpha mask for the second video frame (image) at time $t=1$ can be estimated by using the first primary coefficient a, and the first secondary coefficient b, determined at time $t=0$, as an approximation. Likewise, a third alpha mask for a third video frame (image) at time $t=2$ can be estimated by using a second primary coefficient a, and a second secondary coefficient b, determined for the second alpha mask at time $t=1$, as an approximation.

The primary coefficient a and the secondary coefficient b are a function of the alpha mask and the video frame, like the alpha mask is a function of the primary coefficient a and the secondary coefficient b and the video frame. When the video changes from frame to frame, and the alpha mask thereby also changes, the coefficients a and b are accordingly also different from frame to frame. The coefficients a and b enter linearly into:

$$\alpha_i^{(t)} = a_k^{(t)} I_i^{(t)} + b_k^{(t)}, \forall i \in \omega_k \quad (1)$$

The coefficients a and b changing from video frame to video frame can be seen, as illustrated in FIG. 1, as the difference in the images at the top at time t=0 and the corresponding images at time t=1.

The method may comprise that the alpha mask can be written as a linear combination of a local windowed model. The primary coefficient a and the secondary coefficient b of the alpha mask are known to be low-frequent in the spatial domain. It is an advantage of the present method that the primary coefficient a and the secondary coefficient b can also be assumed to be low-frequent in the temporal domain, meaning that they can be used as a latent representation to propagate signal from one frame to the next. In each frame, the alpha mask is realized as a function of these coefficients and the available video frame. The second video frame may be the video frame immediately or directly after the first video frame.

The alpha mask or alpha matte of an image, such as a video frame, may represent transparency in the image. Alpha compositing is the process of combining an image with a background to create the appearance of partial or full transparency. It may be useful to render image elements in separate passes, and then combine the resulting multiple 2D images into a single, final image called the composite. For example, compositing may be used when combining computer-rendered image elements with live footage.

In order to combine these image elements correctly, an associated matte for each element may be kept. This matte contains the coverage information, i.e. the shape of the geometry being drawn, making it possible to distinguish between parts of the image where the geometry was actually drawn and other parts of the image that are empty.

In a 2D image element, such as video frame, which stores a color for each pixel, additional data is stored in the alpha channel e.g. with a value between 0 and 1. A value of 0 means that the pixel does not have any coverage information and is transparent; i.e. there was no color contribution from any geometry because the geometry did not overlap this pixel. A value of 1 means that the pixel is opaque because the geometry completely overlapped the pixel. A typical colorspace or color channels may be RGB (red, green, blue), where the colors R, G and B are values between 0 and 1. Other colorspaces or color channels may be used.

Thus, the alpha mask or alpha matte can be used to distinguish between regions in an image, such as a video frame. Regions in an image may be a first, e.g. foreground, region such as a person; a second, e.g. background, region such as the surroundings of the person in the foreground; and for example a third, e.g. middle, region such as a train.

The alpha mask or alpha matte can thus be used to determine the first region, for instance by comparing alpha values of a pixel with threshold values. Alpha is a value indicating the opacity of each pixel which may be in the range from 0 to 1, with 0 being completely transparent and 1 being completely opaque. For example, pixels of the image with an alpha value within a certain range, such as from 0.10 to 0.90 may be regarded as part of the first region.

According to the present method, the method comprises obtaining a first alpha mask of the first video frame. The first alpha mask may be obtained by determining a first keyframe alpha mask. The first alpha mask may be obtained through user interaction with an annotation interface, such as the user manually marking, drawing, indicating or identifying the alpha mask on the first video frame. Alternatively, the first alpha mask may be exported from an application, such as Adobe Photoshop.

The first alpha mask may be obtained through a series of morphological operations, filtering operations or other standard image processing methods.

The first alpha mask may be obtained through a predictive machine learning model, such as random forests, convolutional neural networks or support vector regression.

The first alpha mask may be obtained through solution of the alpha matting problem, either as a closed form solution, see Levin, A., Lischinski, D., & Weiss, Y. (2008). A closed-form solution to natural image matting. IEEE Transactions on Pattern Analysis and Machine Intelligence, 30(2), 228-42, or as a sampling solution, see Sun, J., Jia, J., Tang, C., & Shum, H. (2004). Poisson Matting, 1(212), 315-321.

A primary coefficient and/or a secondary coefficient, such as the first primary coefficient and the first secondary coefficient may be constant and/or assumed constant for all pixels within a window of the respective video frame.

In some embodiments the first primary coefficient and the first secondary coefficient are constant for all pixels within a window of the first video frame. Thus the first primary coefficient and the first secondary coefficient may be constant or the same for all pixels in a window or subset of the first video frame.

In some embodiments a second primary coefficient and a second secondary coefficient for the second alpha mask are constant for all pixels within a window of the second video frame. In some embodiments a third primary coefficient and a third secondary coefficient for a third alpha mask are constant for all pixels within a window of a third video frame. In some embodiments a fourth primary coefficient and a fourth secondary coefficient for a fourth alpha mask are constant for all pixels within a window of a fourth video frame.

In some embodiments the window of the first video frame, the second video frame, the third video frame, and/or the fourth video frame, is 51 pixels×51 pixels.

In some embodiments the window of the first video frame, the second video frame, the third video frame, and/or the fourth video frame, is below 51 pixels×51 pixels.

In some embodiments the window of the first video frame, the second video frame, the third video frame, and/or the fourth video frame, is 25 pixels×25 pixels.

It is an advantage that the method is computationally tractable to calculate using convolution operations, which perform well on graphics processing units (GPUs), while maintaining a high fidelity of the result. Convolution operations may be well suited for parallel processing.

In some embodiments estimating the second primary coefficient and the second secondary coefficient comprises convolution operations.

In some embodiments estimating a third primary coefficient and a third secondary coefficient comprises convolution operations. In some embodiments estimating a fourth primary coefficient and a fourth secondary coefficient comprises convolution operations. In some embodiments estimating a first primary coefficient and a first secondary coefficient comprises convolution operations.

The convolution operations may be of the downscaled video frame and/or of the downscaled alpha mask.

Convolution operations may comprise summation over subsets of the video frame or image. Each subset of the video frame may be calculated by one GPU, and having N GPU's means that N subsets may be calculated at the same time, i.e. in parallel. Convolution operations are an advantage compared to performing integral operations, as the integral is for the whole image and therefore integral will be slower than convolution since this is parallel calculations for subsets of the image. The convolution operation may be determined or defined by a box filter, by a filter kernel of e.g. 3, 5, 7 etc. Convolution operations provides that the generation of the second alpha mask and consecutive alpha masks is fast enough for real time display of the video frames.

Thus it is an advantage that casting the model as obtainable by a series of small convolutions makes it tractable to perform on a mobile device, such as a smartphone. It is an advantage that the present method can obtain results with small convolutions approximately equivalent to those with large window sizes.

The linear model in Eq 1 comprises the primary coefficient a and the secondary coefficient b which are constant in a window of the video frame. The window may be a subset of the video frame. For estimating these coefficients one has to sum over these windows. Typically this would be done using integral images, as this makes it fast to compute such sums for large windows sizes (constant time). This is shown in the prior art article by Kaiming He, Jian Sun, and Xiaoou Tang: "Guided image Filtering", IEEE Transactions on Pattern Analysis and Machine Intelligence, 35(6): 1397{1409, 2013.

However, integral images cannot readily be optimised for a graphics processing unit (GPU). Large window sizes are desirable as this provides visually pleasing images. Thus the inventors of the present patent application have found that it is possible to acquire approximately as attractive result with small windows, if a downscaling is performed. Small windows are fast to sum over with convolution, since fewer numbers must be added. For small window sizes it is faster to perform convolutions than integral images. Convolutions can be optimised for GPUs. Accordingly, the above makes it possible to perform the present method on for example a smartphone.

Graphics processing units (GPUs) may be used for performing the method. In particular convolution operations, which may be used for estimating the primary coefficients a and the secondary coefficients b, is advantageous to use on GPUs. A graphics processing unit (GPU), occasionally called visual processing unit (VPU), is a specialized electronic circuit designed to rapidly manipulate and alter memory to accelerate the creation of images, such as video frames, in a frame buffer intended for output to a display device. GPUs can be used in embedded systems, mobile phones, personal computers, workstations, and game consoles. GPUs may be very efficient at manipulating computer graphics and image processing, and their highly parallel structure makes them more efficient than general-purpose CPUs for algorithms where the processing of large blocks of data is done in parallel. In a personal computer, a GPU can be present on a video card, or it can be embedded on the motherboard or—in certain CPUs—on the CPU die.

In some embodiments the ratio between the resolution of the first downscaled video frame and the resolution of the first video frame is between ½ and 1/100, such as 1/10 or 1/5.

In some embodiments the ratio between the resolution of a second downscaled video frame and the resolution of the second video frame is between ½ and 1/100, such as 1/10 or 1/5. In some embodiments the ratio between the resolution of a third downscaled video frame and the resolution of a third video frame is between ½ and 1/100, such as 1/10 or 1/5. In some embodiments the ratio between the resolution of a fourth downscaled video frame and the resolution of a fourth video frame is between ½ and 1/100, such as 1/10 or 1/5.

It is an advantage that there may be a computational trade-off for certain ratios, such as a ratio of s=1/5, where the present method makes it feasible to determine the primary coefficient a and the secondary coefficient b for larger window sizes, e.g. up to 25, using convolutions.

The ratio may be based on the video frame resolution, e.g. the ratio may be large for large resolution video frame and smaller for lesser resolution video frame. The ratio may be set to provide a downscaled video frame below a certain resolution.

In some embodiments the resolution of the first downscaled video frame is below 1 megapixel, such as below 0.5 megapixel, or such as below 0.25 megapixel.

In some embodiments the resolution of the second downscaled video frame is below 1 megapixel, such as below 0.5 megapixel, or such as below 0.25 megapixel. In some embodiments the resolution of the third downscaled video frame is below 1 megapixel, such as below 0.5 megapixel, or such as below 0.25 megapixel. In some embodiments the resolution of the fourth downscaled video frame is 1 megapixel, such as below 0.5 megapixel, or such as below 0.25 megapixel.

In some embodiments the first alpha mask is defined by:

$$\alpha_i^{(t)} = a_k^{(t)} I_i^{(t)} + b_k^{(t)}$$

wherein $\alpha(t)$ is the first alpha mask, $I(t)$ is the first video frame, $a(t)$ is the first primary coefficient, and $b(t)$ is the first secondary coefficient, within a window w centered at pixel k with radius r. The time t may be t=0. The window w may have a size of 2r+1 times 2r+1.

Mathematical expressions for the alpha mask are provided below:

Let a video be a sequence of N video frames:

$$I^{(t)}, t \in \{, \ldots, N\}.$$

We assume that the i'th pixel in the alpha mask $\alpha(t)$ of a video frame $I^{(t)}$ at time t can be written as:

$$\alpha_i^{(t)} = a_k^{(t)} I_i^{(t)} + b_k^{(t)}, \forall i \in \omega_k \quad (1)$$

where $$(a_{k(t)}, b_k^{(t)})$$

are the primary coefficient and the secondary coefficient assumed to be constant in the window $w_k$ centered at pixel k with radius r. This assumption implies that for large window sizes r>>1 the linear coefficients are low-frequent in the spatial domain. Notice that primary coefficient $a_k$ and the secondary coefficient $b_k$ can be determined given the alpha mask $\alpha^{(t)}$ and the video frame $I^{(t)}$. Note that this is the same linear transformation model as in the prior art article by Kaiming He, Jian Sun, and Xiaoou Tang: "Guided image Filtering", IEEE Transactions on Pattern Analysis and Machine Intelligence, 35(6):1397{1409, 2013.

According to the present method, the following steps may be applied:

i) assume and exploit that the linear coefficients, i.e. the primary coefficient a, and the secondary coefficient b, are also low-frequent in the temporal domain for large window sizes. Thus the second primary coefficient $a^{(t)}$ for a second video frame at time t may be considered to be approximately equal to the first primary coefficient $a^{(t-1)}$ for a first video frame at time t−1. Correspondingly, the second secondary coefficient $b^{(t)}$ for a second video frame at time t may be considered to be approximately equal to the first secondary coefficient $b^{(t-1)}$ for a first video frame at time t−1:

$$a_k^{(t)} \approx a_k^{(t-1)} \wedge b_k^{(t)} \approx b_k^{(t-1)}, r>>1$$

ii) approximate the pixels of the alpha mask α for the t'th video frame I as:

$$\hat{\alpha}_i^{(t)} = a_k^{(t-1)} I_i^{(t)} + b_k^{(t-1)}$$

and subsequently approximate the linear coefficients, i.e. the primary coefficient:

$$\hat{a}_k^{(t)}$$

and the secondary coefficient:

$$\hat{b}_k^{(t)}$$

from the alpha mask:

$$\hat{\alpha}^{(t)}$$

iii) realize that the following two methods for obtaining the alpha mask $\alpha^{(t)}$ are approximately equivalent:
(1) given the video frame $I^{(t)}$ with resolution h×w=N, calculate the alpha mask $\alpha^{(t)}$ as in eq. (1) with window size r.
(2) given the downscaled or resized video frame:

$$\tilde{I}^{(t)}$$

which is $I^{(t)}$ scaled with the factor s, with resolution sh×sw=s² N, determine the downscaled primary coefficient:

$$\tilde{a}_k^{(t)}$$

and the downscaled secondary coefficient:

$$\tilde{b}_k^{(t)}$$

using window size sr, resize these coefficients to resolution N and obtain the alpha mask $\alpha^{(t)}$ as in Eq. (1).
iiii) exploit that convolution operators are significantly more computationally efficient for small window sizes.

One or more of the above steps allow the present method to be computationally tractable, which opens up for real-time processing. For instance, by rescaling the video frame by a factor s=⅕, the linear coefficients, i.e. the primary coefficient a and the secondary coefficient b, can be determined from the lower resolution video frame using only a window size r=5 rather than 25. Combined with the observation that the primary coefficient a and the secondary coefficient b exhibit temporal smoothness for large window sizes, r>>1, the present method makes it possible to rapidly propagate the alpha mask from one video frame to the next video frame without having to calculate for example an integral image.

In some embodiments the plurality of video frames includes a third video frame. The method may comprise providing a second downscaled video frame, wherein the second downscaled video frame is a lower resolution version of the second video frame. The method may comprise providing a second downscaled alpha mask of the second alpha mask. The method may comprise estimating a second primary coefficient and a second secondary coefficient based on the second downscaled video frame and the second downscaled alpha mask. The method may comprise generating a third alpha mask for the third video frame based on the second primary coefficient and the second secondary coefficient.

Thus it is an advantage that the alpha mask for a third video frame can be generated based on the second primary coefficient and the second secondary coefficient from the second alpha mask of the previous second video frame. The third video frame may be the video frame immediately or directly after the second video frame. The second video frame may be the video frame immediately or directly after the first video frame.

In some embodiments the plurality of video frames includes a fourth video frame. The method may comprise providing a third downscaled video frame, wherein the third downscaled video frame is a lower resolution version of the third video frame. The method may comprise providing a third downscaled alpha mask of the third alpha mask. The method may comprise estimating a third primary coefficient and a third secondary coefficient based on the third downscaled video frame and the third downscaled alpha mask. The method may comprise generating a fourth alpha mask for the fourth video frame based on the third primary coefficient and the third secondary coefficient.

In some embodiments the plurality of video frames includes a fourth video frame. The method may comprise providing a third downscaled video frame, wherein the third downscaled video frame is a lower resolution version of the third video frame. The method may comprise providing a third downscaled alpha mask of the third alpha mask. The method may comprise estimating a third primary coefficient and a third secondary coefficient based on a second keyframe alpha mask and the third downscaled video frame. The method may comprise generating a fourth alpha mask for the fourth video frame based on the third primary coefficient and third secondary coefficient.

Thus a second keyframe alpha mask, or a first keyframe alpha mask, may be used for estimating the third primary coefficient and the third secondary coefficient for the third video frame.

The method may comprise obtaining a keyframe alpha mask based on a corresponding video frame. For example, the method may comprise obtaining the second keyframe alpha mask based on the second video frame.

The second keyframe alpha mask may be determined like a first keyframe alpha mask is determined. The second keyframe alpha mask may be obtained through user interaction with an annotation interface, such as the user manually marking, drawing, indicating or identifying the alpha mask on the second video frame. Alternatively, the second keyframe alpha mask may be exported from an application, such as Adobe Photoshop.

A keyframe alpha mask, such as the second keyframe alpha mask, may be obtained through a series of morphological operations, filtering operations or other standard image processing methods.

A keyframe alpha mask, such as the second keyframe alpha mask, may be obtained through a predictive machine learning model, such as random forests, convolutional neural networks or support vector regression.

A keyframe alpha mask, such as the second keyframe alpha mask, may be obtained through solution of the alpha matting problem, either as a closed form solution, see Levin, A., Lischinski, D., & Weiss, Y. (2008). A closed-form solution to natural image matting. IEEE Transactions on Pattern Analysis and Machine Intelligence, 30(2), 228-42, or as a sampling solution, see Sun, J., Jia, J., Tang, C., & Shum, H. (2004). Poisson Matting, 1(212), 315-321.

It is an advantage that when the assumedly more correct or precise second keyframe alpha mask has been determined, then the third primary coefficient and the third secondary coefficient can be estimated based on this second keyframe alpha mask in order to obtain a better result for the fourth alpha mask.

As it takes longer time to determine the second keyframe alpha mask than the second alpha mask, the second keyframe alpha mask may not be suited to determine the second primary coefficient and the second secondary coefficient, as the alpha masks should be generated fast enough for real time display, but the second keyframe alpha may be used to determine subsequent primary coefficients and secondary coefficients, such as the third primary coefficient and the third secondary coefficient for the third video frame, or such as the fourth primary coefficient and the fourth secondary coefficient for the fourth video frame, or further subsequent primary coefficients and secondary coefficients.

The fourth video frame may be the video frame immediately or directly after the third video frame. Alternatively, the fourth video frame may not be the video frame immediately or directly after the third video frame, thus there may be one or more video frames in between the third and the fourth video frame.

Thus, the primary coefficient a and the secondary coefficient b may be determined for a keyframe alpha mask for a preceding video frame. The keyframe alpha mask may not be determined for the video frame directly before, but may be determined for a video frame two, three, four or more video frames before the present video frame.

In some embodiments generating the fourth alpha mask comprises updating the third primary coefficient and the third secondary coefficient to the fourth video frame.

In some embodiments, estimating the third primary coefficient and the third secondary coefficient comprises updating the second keyframe alpha mask to the third video frame. For example, estimating the third primary coefficient and the third secondary coefficient comprises estimating a second primary keyframe coefficient and a second secondary keyframe coefficient based on the second keyframe alpha mask and the second video frame. Estimating the second primary keyframe coefficient and the second secondary keyframe coefficient may be based on a downscaled second keyframe alpha mask of the second keyframe alpha mask and a downscaled second video frame of the second video frame.

In some embodiments the method comprises estimating a second keyframe primary coefficient and a second keyframe secondary coefficient based on the second keyframe alpha mask. The second keyframe alpha mask may be calculated concurrently with the generation of the second alpha mask and/or the third alpha mask. Obtaining the second keyframe alpha mas may comprise calculating the second keyframe alpha mask based on the second video frame.

It is an advantage that the calculation of the second keyframe alpha mask is performed concurrently with the calculation of several temporal alpha masks, e.g. the second alpha mask, the third alpha mask, the fourth alpha mask etc.

The present method referred to as the temporal model is able to predict the alpha mask for the next video frame, given the image for the next frame and the (predicted) alpha mask for the current frame. Sometimes it may be desirable to run a more complex model, such as a deep neural network, to get a better prediction (a keyframe). Usually such a keyframe model is not fast enough to keep up with the camera frame rate, wherefore the fast temporal model (the present method) is needed while the keyframe model is running. However, assuming that the keyframe model takes time $\Delta k$ to process a video frame, then by the time it has processed a frame from time t, the result is outdated by $\Delta k \times fps$ frames. Say it takes 5 seconds to process a keyframe and the camera has a framerate at 60 frames per second (fps). This means that when the keyframe processing has finished, the camera has processed 300 frames and the result from the keyframe model is "outdated" in some sense.

FIG. 4 illustrates a solution to this problem. The process is as follows: The camera delivers a frame every 1/fps second and the temporal model needs to process this in $\Delta t < 1/fps$. This may be a strict requirement to keep up with the camera frame rate. The keyframe model needs time $\Delta k$ to process the frame, whereafter an update process needs to catch up with the temporal model, which takes time $\Delta c$. Notice that the temporal model has a new state s2 available when the keyframe and update processes have finished.

The update process uses the very same temporal model, which puts further requirements on the processing time. The update process will have caught up with the camera x frames after time t when the keyframe started processing:

$$x \cdot \frac{1}{fps} = \Delta_k + \Delta_c \quad (4)$$

$$= \Delta_k + x \cdot \Delta_t \Leftrightarrow \quad (5)$$

$$x\left(\frac{1}{fps} - \Delta_t\right) = \Delta_k \Leftrightarrow \quad (6)$$

$$x = \frac{\Delta_k}{\left(\frac{1}{fps} - \Delta_t\right)}. \quad (7)$$

Note that the longer the keyframe takes to compute, the faster the temporal model needs to be relative to the camera frame rate. As an example, let's set the keyframe processing time to 2 seconds $\Delta k=0.5$, the camera frame rate at 60 fps. With a temporal model capable of 200 frames per second the time is $\Delta t=0.005$, the result from the keyframe at time t will be ready after x=172 frames, which is a little under three seconds. It may be desirable to keep x small to have frequent keyframe updates.

This can be achieved by parallelizing either the update process and/or the keyframe process. Parallelizing solely the update process may only make sense when $\Delta k < \Delta c$.

Thus it is an advantage to have a keyframe model, which is slow, but which provides a very precise result, and to have a temporal model (the present method), which is fast, but providing a less precise result. The slow keyframe model is not under real-time constraints and can accordingly spend more time on the calculations and thereby use more complicated models. While the slow keyframe model is calculating the precise result, the fast temporal model is used such that the video frames constantly coming from the camera can be shown on the display to the user. When the slow keyframe model is finished calculating the next alpha mask, the result from the slow keyframe model may be combined, integrated, or coordinated with the result from the fast temporal model where the fast temporal model has reached. The result from the precise slow keyframe model may completely replace the result from the fast temporal mode. Alternatively, the precise result from the slow keyframe model may be combined with the less precise result from the fast temporal model, e.g. by Kalman filtering.

It is an advantage that when the temporal model is very fast, the slow keyframe model can be slower, than if the temporal model was not as fast. Thus the faster the temporal model is, the slower the keyframe model can be.

In some embodiments the method comprises estimating a temporary fourth primary coefficient and a temporary fourth secondary coefficient based on the fourth alpha mask and the fourth downscaled video frame; and wherein generating the fourth alpha mask comprises using Kalman filtering to combine the temporary fourth primary coefficient and the temporary fourth secondary coefficient with the fourth primary coefficient and the fourth secondary coefficient to generate the fourth alpha mask.

In some embodiments, the method comprises estimating a temporary third primary coefficient and a temporary third secondary coefficient based on the third downscaled alpha mask and the fourth downscaled video frame. The third primary coefficient and the third secondary coefficient may be based on the second keyframe alpha mask and the third video frame, such as the third downscaled video frame. Generating the fourth alpha mask may comprise using Kalman filtering to combine the temporary fourth primary coefficient and the temporary fourth secondary coefficient with the fourth primary coefficient and the fourth secondary coefficient to generate the fourth alpha mask.

It is an advantage to use Kalman filtering, as Kalman filtering can be used to reduce the uncertainty by using an ensemble of several methods.

Determining the alpha mask for a series of video frames can be seen as a tracking problem. Given a first key frame, where the object of interest is separated from the background, the task is to determine the alpha mask of the same object for the consecutive frames. This will, over time, as uncertainties accumulate result in the alpha mask diverging from the true solution. Kalman filtering is a suitable method for reducing accumulated uncertainties using additional signal sources and keyframes.

The framework for Kalman filtering is well-known in general, but will be briefly described in 1D for individual image pixels here. Another useful approach is to use iconic image representations, flow fields and a full-image state space.

The i'th pixel at frame t has a state:

$$\hat{a}_{(t),i};$$

corresponding to the alpha (transparency) value, and a variance:

$$\sigma_{(t),i}^2.$$

The temporal model can, given an image at time t+1 and the alpha value at time t, predict the alpha value at time t+1. The prediction:

$$\hat{a}_{(t+1),i}$$

has an uncertainty p associated at each pixel. At time t+1 the standard deviation (uncertainty) at pixel i will be updated as:

$$\sigma_{(t+1),i}^2 = \sigma_{(t),i}^2 + p_{(t+1),i}^2. \quad (8)$$

Evidently, the uncertainty will keep growing frame-by-frame, if nothing else is done. The Kalman filter is particularly well suited for integration of multiple measurements, such as sensor inputs, as well as known internal state influences. Here we will consider the case, when a new measurement μ(t) is available at time t. A measurement also has uncertainties δi attached in every pixel. The better the measurement, the smaller the uncertainty. The Kalman gain can be calculated in every pixel given the existing uncertainty in every pixel and the measurement uncertainty:

$$k_i = \frac{\sigma_{(t),i}^2}{\sigma_{(t),i}^2 + \delta_i}. \quad (9)$$

The state can now be updated in a sensible manner:

$$\hat{a}_{(t+1),i} = \hat{a}_{(t),i} + k_i^*(\mu_{(t),i} - \hat{a}_{(t),i}) \quad (10)$$

$$\sigma_{(t+1),i}^2 = \sigma_{(t),i}^2 - k_i^* \sigma_{(t),i}^2. \quad (11)$$

Notice how the Kalman gain in this one dimensional setting simply is a weighting between predicted state and the new measured state.

The Kalman filter is a meaningful way to integrate the predictions from a temporal model (the present method) and a keyframe model. It can also be used to integrate sensor inputs or other external influences. Note that Kalman filtering has much more potential for uncertainty reduction, when used in higher dimensional state spaces than 1D.

The external influences considered here may be:
Object movement (e.g., person moving);
Camera moving (measured via accelerometer);
while the measurements considered may be:
User annotations;
Key frame predictions.

As an alternative to combining coefficients determined from the second keyframe alpha mask and the temporal fourth alpha mask, the coefficients determined from the second keyframe alpha mask may be selected to estimate the next alpha mask, as these coefficients may be the most correct/precise.

The present invention relates to different aspects including the method described above and in the following, and corresponding methods, electronic devices, systems, networks, uses and/or product means, each yielding one or more of the benefits and advantages described in connection with the first mentioned aspect, and each having one or more embodiments corresponding to the embodiments described in connection with the first mentioned aspect and/or disclosed in the appended claims.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
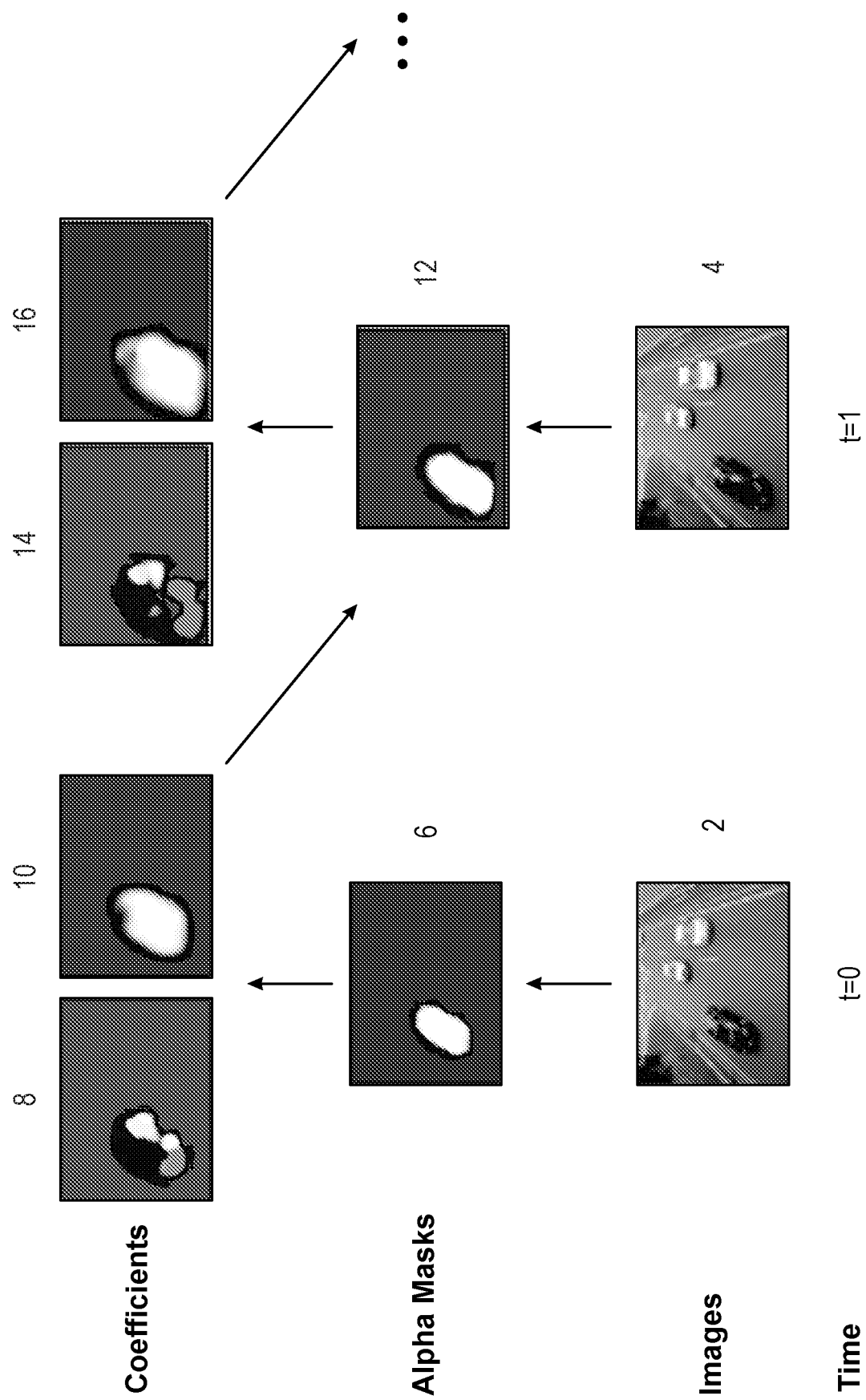
FIG. 1 schematically illustrates an example of the method to generate alpha masks of video frames in a video FIG. 2 schematically illustrates an example of the method to generate alpha masks of video frames in a video.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Throughout, the same reference numerals are used for identical or corresponding parts.

FIG. 1 schematically illustrates an example of the method to generate alpha masks of video frames in a video comprising a plurality of video frames including a first video frame 2 and a second video frame 4 following the first video frame 2. The method comprises obtaining a first alpha mask 6 of the first video frame 2. The method comprises providing a first downscaled video frame, wherein the first downscaled video frame is a lower resolution version of the first video frame 2. The method comprises providing a first downscaled alpha mask of the first alpha mask 6. The method comprises estimating a first primary coefficient 8 and a first secondary coefficient 10 based on the first downscaled video frame and the first downscaled alpha mask. The method comprises generating a second alpha mask 12 for the second video frame 4 based on the first primary coefficient 8 and the first secondary coefficient 10.

Thus FIG. 1 illustrates the method, which may be disclosed as a method of temporally propagating the coefficients of the alpha masks. The first video frame 2 may be read in as a keyframe alpha mask and some method is used to obtain the first keyframe alpha mask 6. The first alpha mask 6 and the first video frame 2 are used to obtain the linear coefficients 8, 10. The linear coefficients 8, 10 for the first video frame 2 are propagated to the second video frame 4 and used together with the second video frame 4 to obtain the second alpha mask 12 for the second video frame 4. The second alpha mask 12 for the second video frame 4 is then used to obtain the second primary coefficient 14 and the second secondary coefficient 16 for the second video frame 4, which are then propagated to the next frame, i.e. the third video frame, and the steps for generating the third alpha mask, fourth alpha mask etc. are repeated for the following video frames.

The first video frame 2 is for time t=0. The second video frame 4 is for time t=1. The third video frame is for time t=2 etc.

As seen from FIG. 1, the images or video frames 2, 4 show driving cars on a street. The alpha masks 6, 12 show the alpha mask or shape of the dark car in the bottom left corner.

Figure 2:
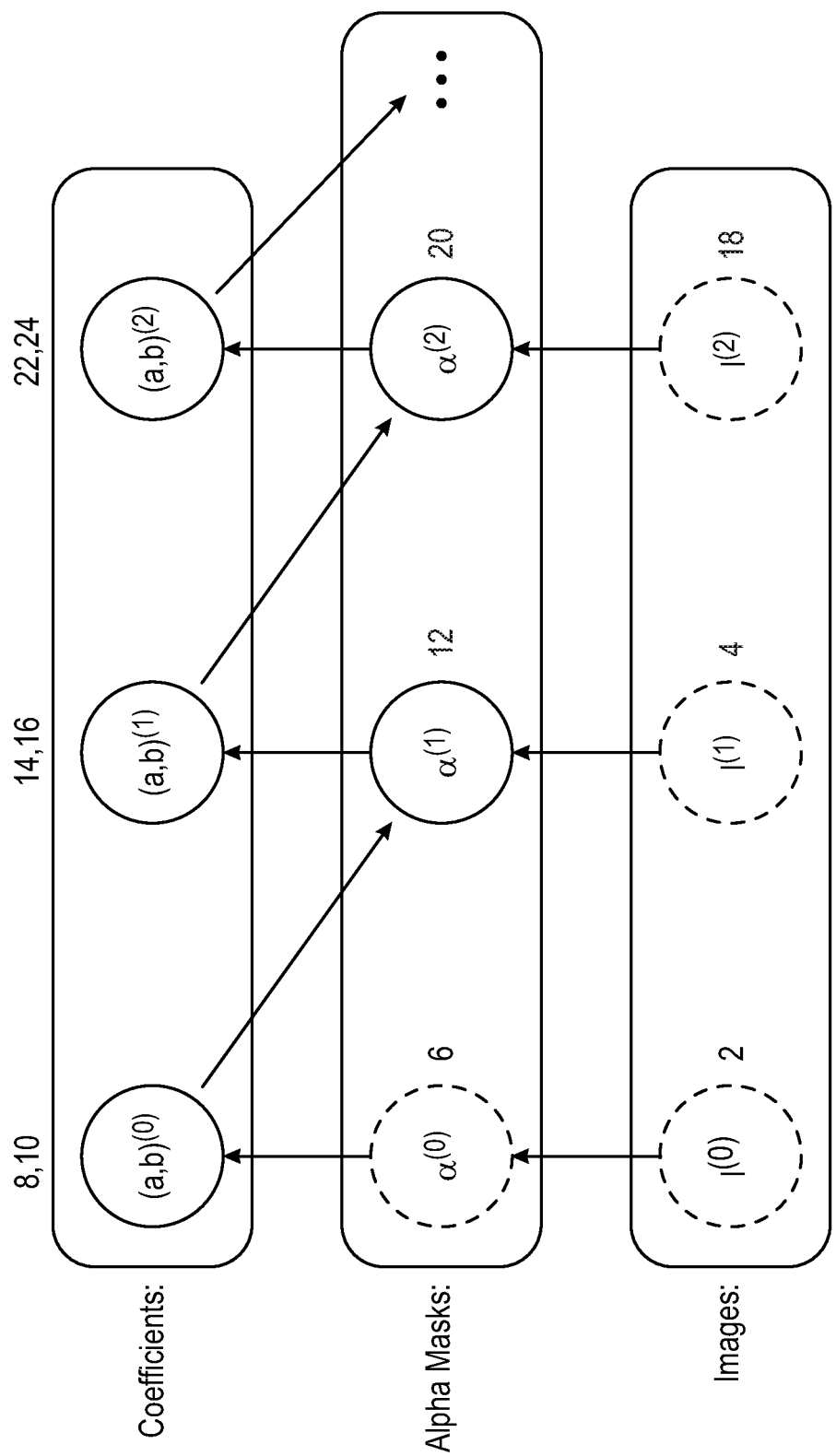

FIG. 2 schematically illustrates an example of the method to generate alpha masks of video frames in a video comprising a plurality of video frames including a first video frame 2 and a second video frame 4 following the first video frame 2. The method comprises obtaining a first alpha mask 6 of the first video frame 2. The method comprises providing a first downscaled video frame, wherein the first downscaled video frame is a lower resolution version of the first video frame 2. The method comprises providing a first downscaled alpha mask of the first alpha mask 6. The method comprises estimating a first primary coefficient 8 and a first secondary coefficient 10 based on the first downscaled video frame and the first downscaled alpha mask. The method comprises generating a second alpha mask 12 for the second video frame 4 based on the first primary coefficient 8 and the first secondary coefficient 10.

The plurality of video frames further includes a third video frame 18. The method comprises providing a second downscaled video frame, wherein the second downscaled video frame is a lower resolution version of the second video frame 6. The method comprises providing a second downscaled alpha mask of the second alpha mask 12. The method comprises estimating a second primary coefficient 14 and a second secondary coefficient 16 based on the second downscaled video frame and the second downscaled alpha mask. The method comprises generating a third alpha mask 20 for the third video frame 18 based on the second primary coefficient 14 and the second secondary coefficient 16.

The third alpha mask 20 for the third video frame 18 is then used to obtain the third primary coefficient 22 and the third secondary coefficient 24 for the third video frame 18, which are then propagated to the next frame, i.e. the fourth video frame, and the steps for generating the fourth alpha mask, fifth alpha mask etc. are repeated for the following video frames.

The first video frame 2 is for time t=0. The second video frame 4 is for time t=1. The third video frame is for time t=2 etc.

Thus FIG. 2 is an illustration of the estimation sequence. Images ($I^{(t)}$) 2, 4, 18 are video frames obtained from the video sequence, the first alpha mask ($\alpha^{(0)}$) 6 is obtained by other means as a key frame. The first coefficients ($(a, b)^{(t)}$) 8, 10, are obtained from the first alpha mask 6, and used to estimate the alpha mask 12 of the next frame 6 together with the next video frame 6, etc. The second coefficients ($(a, b)^{(t)}$) 14, 16, are obtained from the second alpha mask 12, and used to estimate the alpha mask 20 of the next frame 18 together with the next video frame 18, etc. Dashed circles indicate observed variables 2, 4, 6, 18. Note that the first alpha mask 6 is illustrated as observed in this case, since it is a key frame.

FIG. 3 schematically illustrates an image or video frame 2, 4, 18. The video frame 2, 4, 18 comprises a plurality of pixels 26. For illustrative purposes the video frame 2, 4, 18 comprises 5×5 pixels 26, however in real cases there may be many more pixels 26 in a video frame, such as 1024×768, or such as 2048×1536, or such as 512×384. The primary coefficient and the secondary coefficient are assumed to be constant in a window 28, 28' centered at pixel 26', 26".

Figure 3A:
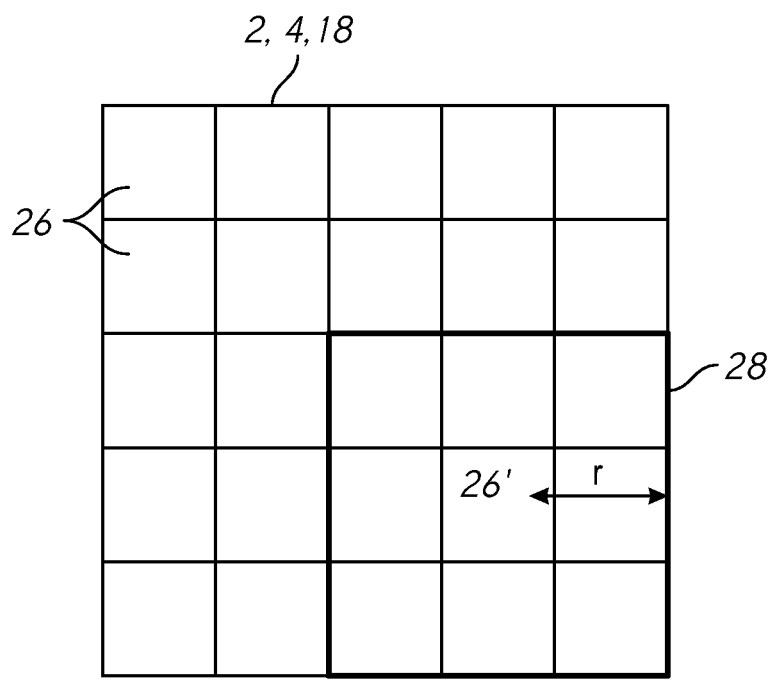
FIG. 3 schematically illustrates an image or video frame comprising pixels and window(s).

FIG. 3a) shows that the window 28 is centered at pixel 26' with radius r. Thus the window 28 may have size 2r+1×2r+1. Alternatively the window may have size r×r.

Figure 3B:
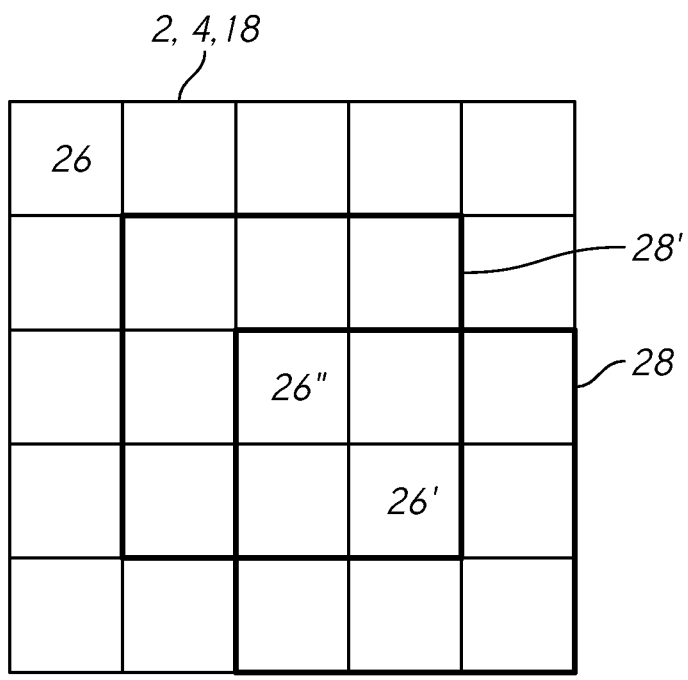

FIG. 3b) shows that window 28' centered at pixel 26" overlaps window 28 centered at pixel 26'. Thus there may be a window 28, 28' centered at each pixel 26.

Figure 4:
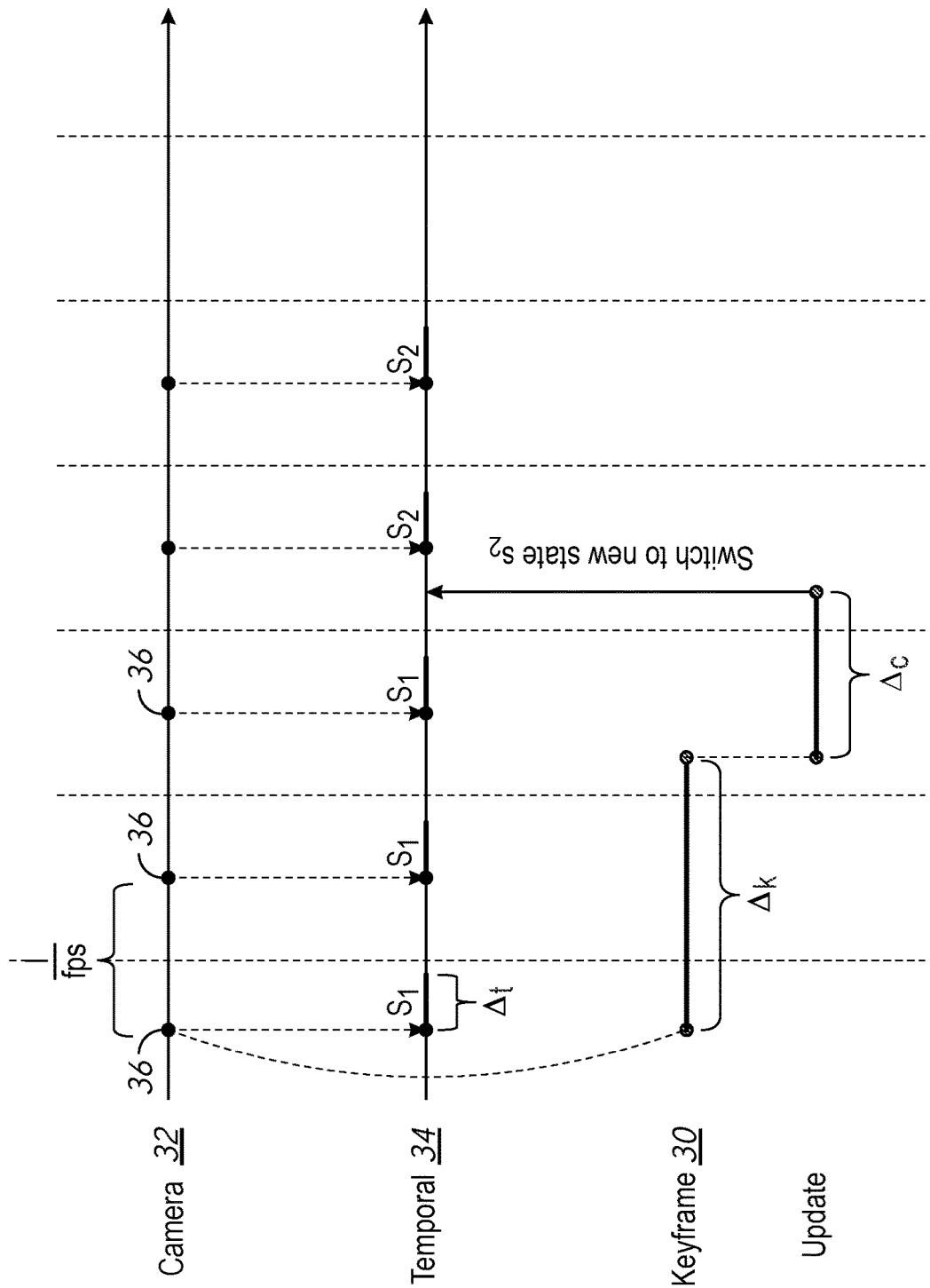
FIG. 4 schematically illustrates an asynchronous rendering of a slow keyframe model and model updating, while a fast temporal model continuously renders frames from the camera.

FIG. 4 schematically illustrates an asynchronous rendering of a slow keyframe model and model updating, while a fast temporal model continuously renders frames from the camera. Black thick lines indicate that the process is busy.

The present method referred to as the temporal model is able to predict the alpha mask for the next video frame, given the image for the next frame and the (predicted) alpha mask for the current frame. Sometimes it may be desirable to run a more complex model, such as a deep neural network, to get a better prediction (a keyframe). Usually such a keyframe model 30 is not fast enough to keep up with the camera frame rate 32, wherefore the fast temporal model 34 (the present method) is needed while the keyframe model 30 is running. However, assuming that the keyframe model 30 takes time $\Delta k$ to process a frame 36, then by the time the keyframe model 30 has processed a frame 36 from time t, the result is outdated by $\Delta k \times fps$ frames. Say it takes 5 seconds to process a keyframe and the camera 32 has a framerate at 60 frames per second (fps). This means that when the keyframe 30 processing has finished, the camera 32 has processed 300 frames and the result from the keyframe model 30 is "outdated" in some sense.

FIG. 4 illustrates a solution to this problem. The process is as follows: The camera 32 delivers a frame 36 every 1/fps second and the temporal model 34 needs to process this in Δt<1/fps. This may be a strict requirement to keep up with the camera frame rate. The keyframe model 30 needs time Δk to process the frame 36, whereafter an update process needs to catch up with the temporal model 34, which takes time Δc. Notice that the temporal model 34 has a new state s2 available when the keyframe 30 and update processes have finished.

The update process uses the very same temporal model 34, which puts further requirements on the processing time. The update process will have caught up with the camera 32×frames 36 after time t when the keyframe 30 started processing:

$$x \cdot \frac{1}{fps} = \Delta_k + \Delta_c \quad (4)$$

$$= \Delta_k + x \cdot \Delta_t \Leftrightarrow \quad (5)$$

$$x\left(\frac{1}{fps} - \Delta_t\right) = \Delta_k \Leftrightarrow \quad (6)$$

$$x = \frac{\Delta_k}{\left(\frac{1}{fps} - \Delta_t\right)}. \quad (7)$$

Note that the longer the keyframe 30 takes to compute, the faster the temporal model 34 needs to be relative to the camera frame rate. As an example, let's set the keyframe processing time to 2 seconds, Δk=2, the camera frame rate at 60 fps. With a temporal model 34 capable of 200 frames per second the time is Δt=0.005, the result from the keyframe 30 at time t will be ready after x=172 frames, which is a little under three seconds. It may be desirable to keep x small to have frequent keyframe updates.

This can be achieved by parallelizing either the update process and/or the keyframe process. Parallelizing solely the update process may only make sense when Δk<Δc.

Figure 5:
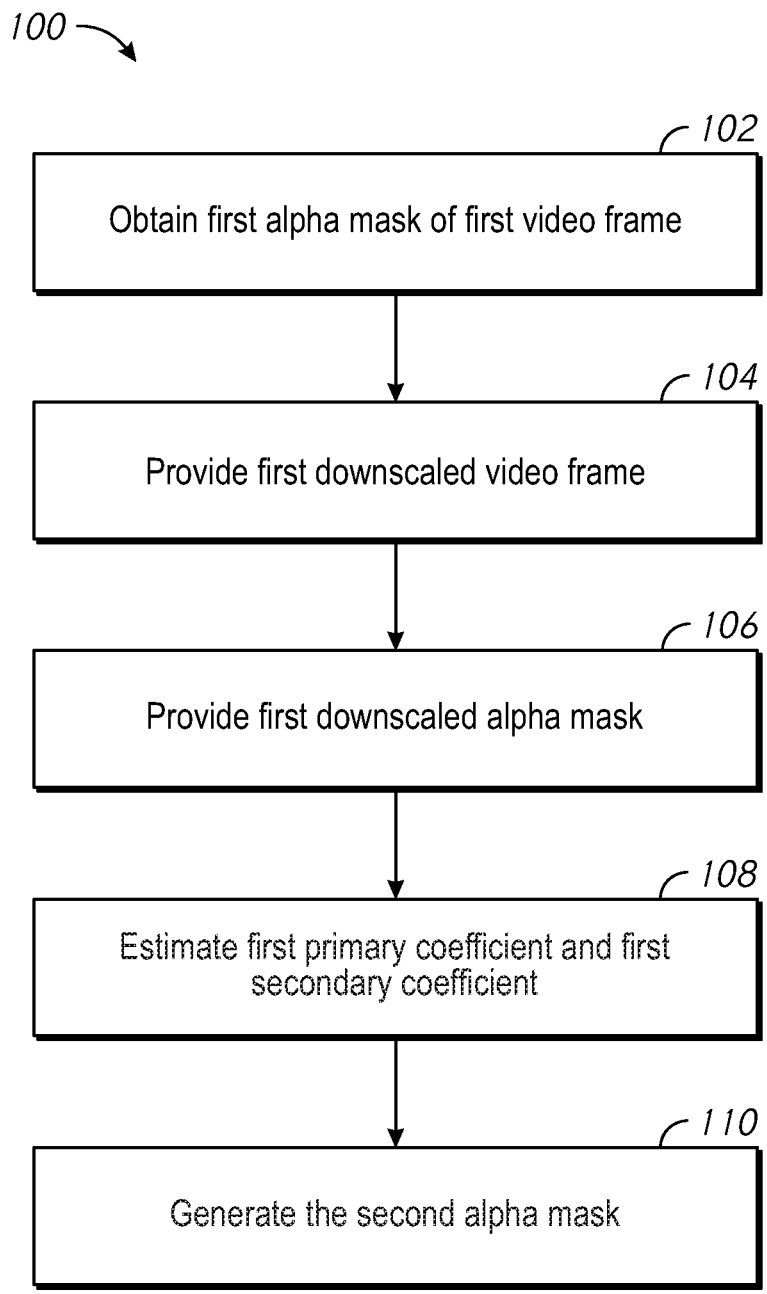
FIG. 5 schematically illustrates a flow chart of a method to generate alpha masks of video frames.

FIG. 5 schematically illustrates a flow chart of a method 100 to generate alpha masks of video frames in a video comprising a plurality of video frames including a first video frame and a second video frame following the first video frame. The method 100 comprises:

In step 102 a first alpha mask of the first video frame is obtained.

In step 104 a first downscaled video frame is provided, wherein the first downscaled video frame is a lower resolution version of the first video frame.

In step 106 a first downscaled alpha mask of the first alpha mask is provided.

In step 108 a first primary coefficient and a first secondary coefficient is estimated based on the first downscaled video frame and the first downscaled alpha mask.

In step 110 a second alpha mask for the second video frame is generated based on the first primary coefficient and the first secondary coefficient.

Figure 6:
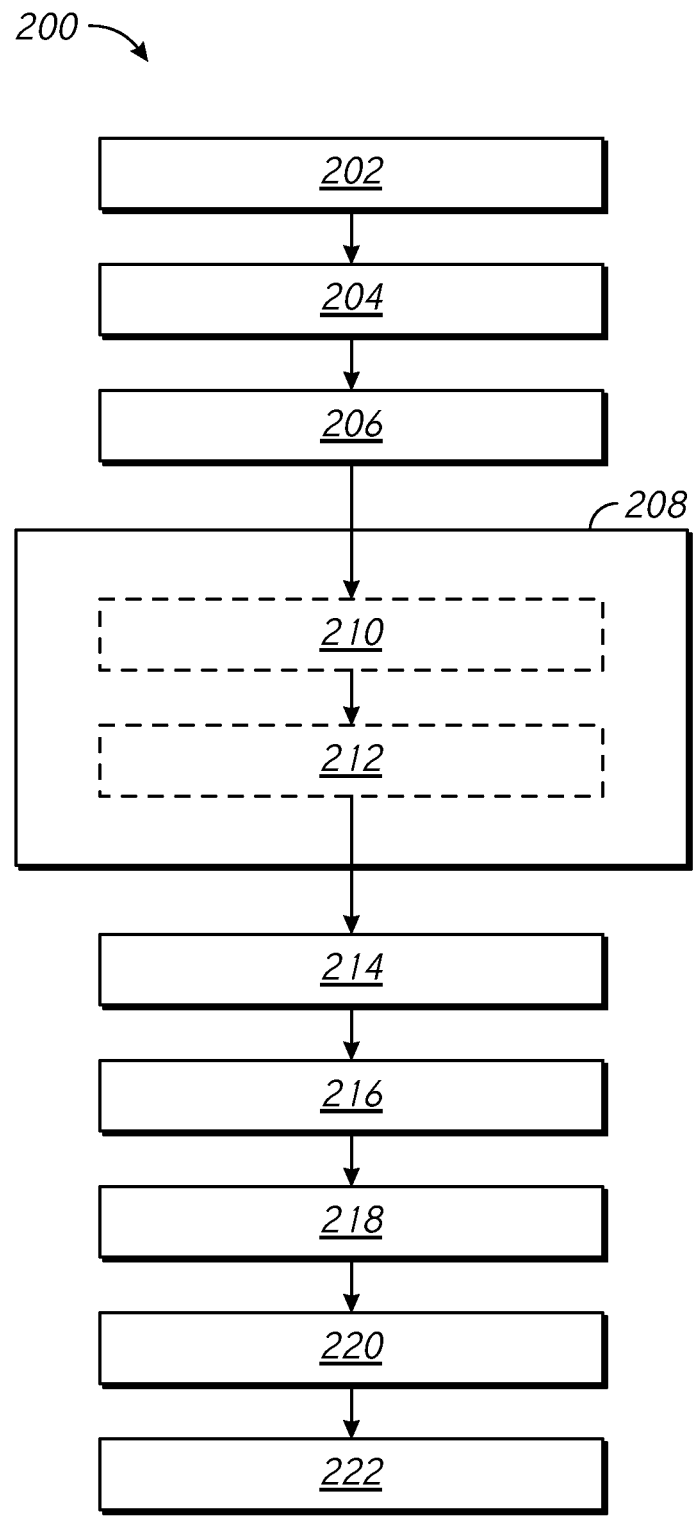
FIG. 6 schematically illustrates a flow chart of a method to generate alpha masks of video frames.

FIG. 6 schematically illustrates a flow chart of an exemplary method 200 to generate alpha masks of video frames, such as video frames in a video comprising a plurality of video frames including a first video frame, a second video frame and a third video frame. The method 200 comprises:

In step 202 a first alpha mask ($\alpha^{(1)}$) of the first video frame ($I^{(1)}$) is obtained.

In step 204 a first downscaled video frame ($\tilde{I}^{(1)}$) of the first video frame is provided. The downscaled video frame may be provided by for example bicubic interpolation of the first video frame.

In step 206 a first downscaled alpha mask ($\tilde{\alpha}^{(1)}$) of the first alpha mask is provided. The downscaled alpha mask may be provided by for example bicubic interpolation of the first alpha mask.

In step 208 a first primary coefficient ($a^{(1)}$) and a first secondary coefficient ($b^{(1)}$) is estimated based on the first downscaled video frame and the first downscaled alpha mask.

Estimating 208 the first primary coefficient and the first secondary coefficient may comprise convolution operations of the downscaled video frame and/or of the downscaled alpha mask.

Estimating 208 the first primary coefficient and the first secondary coefficient may comprise estimating 210 a downscaled first primary coefficient ($\tilde{a}^{(1)}$) and a downscaled first secondary coefficient ($\tilde{b}^{(1)}$) based on the first downscaled video frame and the first downscaled alpha mask, and resizing 212 the downscaled first primary coefficient and the downscaled first secondary coefficient to obtain the first primary coefficient and the first secondary coefficient.

Resizing 212 the downscaled first primary coefficient and the downscaled first secondary coefficient to obtain the first primary coefficient and the first secondary coefficient may include for example bilinear or bicubic resizing.

In step 214 a second alpha mask ($\alpha^{(2)}$) for the second video frame ($I^{(2)}$) is generated based on the first primary coefficient ($a^{(1)}$) and the first secondary coefficient ($b^{(1)}$), such as wherein $\alpha^{(2)}=a^{(1)}I^{(2)}+b^{(1)}$.

A subsequent alpha mask, such as a third alpha mask for a third video frame may be generated by:

In step 216 a second downscaled video frame ($\tilde{I}^{(2)}$) of the second video frame ($I^{(2)}$) is provided.

In step 218 a second downscaled alpha mask ($\tilde{\alpha}^{(2)}$) of the second alpha mask ($\alpha^{(2)}$) is provided.

In step 220 a second primary coefficient ($a^{(2)}$) and a second secondary coefficient ($b^{(2)}$) is estimated based on the second downscaled video frame and the second downscaled alpha mask.

Estimating 220 the second primary coefficient ($a^{(2)}$) and the second secondary coefficient ($b^{(2)}$) may include the same operations as estimation 208 of the first primary coefficient and the first secondary coefficient.

In step 222 the third alpha mask ($\alpha^{(3)}$) for the third video frame ($I^{(3)}$) is generated based on the second primary coefficient ($a^{(2)}$) and the second secondary coefficient ($b^{(2)}$), such as wherein $\alpha^{(3)}=a^{(2)}I^{(3)}+b^{(2)}$.

Figure 7:
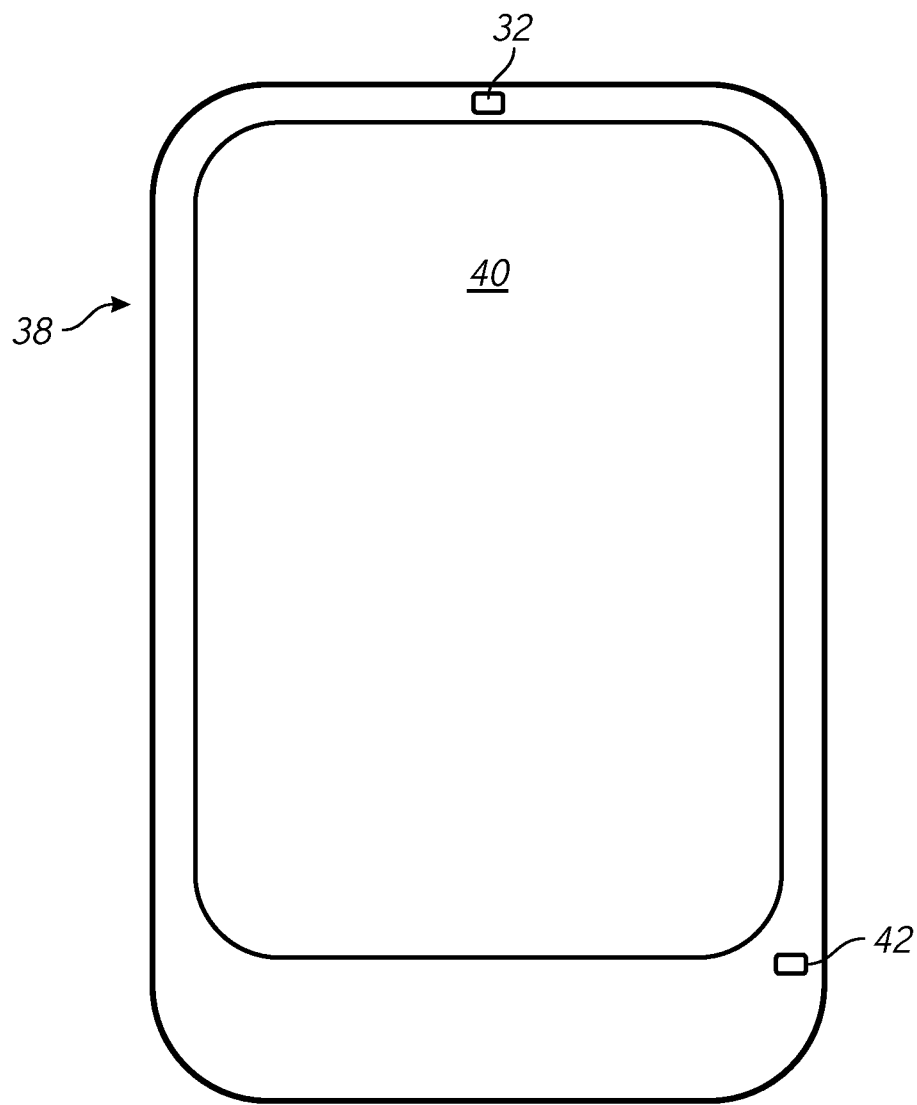
FIG. 7 schematically illustrates an exemplary electronic device for generating alpha masks of video frames in a video.

FIG. 7 schematically illustrates an electronic device 38, such as a smartphone or other computer device, for generating alpha masks of video frames in a video. The electronic device 38 comprises a camera 32 configured to provide the video comprising a plurality of video frames including a first video frame and a second video frame following the first video frame. The electronic device 38 comprises a display 40 configured to display the video frames of the video. The electronic device 38 comprises a processing unit 42 configured to obtain a first alpha mask of the first video frame; provide a first downscaled video frame, wherein the first downscaled video frame is a lower resolution version of the first video frame; provide a first downscaled alpha mask of the first alpha mask; estimate a first primary coefficient and a first secondary coefficient based on the first downscaled video frame and the first downscaled alpha mask; and generate a second alpha mask for the second video frame based on the first primary coefficient and the first secondary coefficient.

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents.

LIST OF REFERENCES 2 first video frame
4 second video frame
6 first alpha mask
8 first primary coefficient
10 first secondary coefficient
12 second alpha mask
14 second primary coefficient
16 second secondary coefficient
18 third video frame
20 third alpha mask
22 third primary coefficient
24 third secondary coefficient
26, 26', 26" pixels
28, 28' window
30 keyframe model
32 camera
34 temporal model
36 frame
38 electronic device
40 display
42 processing unit
100 method
102 method step of obtaining a first alpha mask of the first video frame
104 method step of providing a first downscaled video frame, wherein the first downscaled video frame is a lower resolution version of the first video frame
106 method step of providing a first downscaled alpha mask of the first alpha mask
108 method step of estimating a first primary coefficient and a first secondary coefficient based on the first downscaled video frame and the first downscaled alpha mask
110 method step of generating a second alpha mask for the second video frame based on the first primary coefficient and the first secondary coefficient
200 method
202 method step of obtaining a first alpha mask ($\alpha^{(1)}$) of the first video frame ($I^{(1)}$)
204 method step of providing a first downscaled video frame ($\tilde{I}^{(1)}$) of the first video frame
206 method step of providing a first downscaled alpha mask ($\tilde{\alpha}^{(1)}$) of the first alpha mask.
208 method step of estimating a first primary coefficient ($a^{(1)}$) and a first secondary coefficient ($b^{(1)}$) based on the first downscaled video frame and the first downscaled alpha mask
210 method step of estimating a downscaled first primary coefficient ($\tilde{a}^{(1)}$) and a downscaled first secondary coefficient ($\tilde{b}^{(1)}$) based on the first downscaled video frame and the first downscaled alpha mask
212 method step of resizing the downscaled first primary coefficient and the downscaled first secondary coefficient to obtain the first primary coefficient and the first secondary coefficient
214 method step of generating a second alpha mask ($\alpha^{(2)}$) for the second video frame ($I^{(2)}$) based on the first primary coefficient ($a^{(1)}$) and the first secondary coefficient ($b^{(1)}$), such as wherein $\alpha^{(2)}=a^{(1)}I^{(2)}+b^{(1)}$
216 method step of providing a second downscaled video frame ($\tilde{I}^{(2)}$) of the second video frame ($I^{(2)}$)
218 method step of providing a second downscaled alpha mask ($\tilde{\alpha}^{(2)}$) of the second alpha mask ($\alpha^{(2)}$)
220 method step of estimating a second primary coefficient ($a^{(2)}$) and a second secondary coefficient ($b^{(2)}$) based on the second downscaled video frame and the second downscaled alpha mask
222 method step of generating the third alpha mask ($\alpha^{(3)}$) for the third video frame ($I^{(3)}$) based on the second primary coefficient ($a^{(2)}$) and the second secondary coefficient ($b^{(2)}$), such as wherein $\alpha^{(3)}=a^{(2)}I^{(3)}+b^{(2)}$

The invention claimed is:

1. A method to generate alpha masks of video frames in a video comprising a plurality of video frames including a first video frame and a second video frame following the first video frame, the method comprising:
obtaining a first alpha mask of the first video frame;
estimating a first primary coefficient and a first secondary coefficient based on the first video frame and the first alpha mask, wherein the first downscaled alpha mask is, within a window of the first video frame, a linear function of the first video frame and wherein the first primary coefficient and the first secondary coefficient are coefficients of the linear function;
generating a second alpha mask for the second video frame based on the first primary coefficient and the first secondary coefficient.

2. The method of claim 1, wherein the first primary coefficient and the first secondary coefficient are constant for all pixels within a window of the first video frame.

3. The method of claim 1, wherein estimating the first primary coefficient and the first secondary coefficient comprising convolution operations.

4. The method of claim 1, wherein the obtaining the first alpha mask of the first video frame includes downscaling a first unscaled alpha mask of a first unscaled video frame.

5. The method of claim 4, wherein the ratio between the resolution of the first video frame and the resolution of the first unscaled video frame is between 1/2 and 1/100.

6. The method of claim 1, wherein the first alpha mask is defined by:

$$\alpha_i^{(t)}=a_k^{(t)}I_i^{(t)}+b_k^{(t)}$$

wherein $\alpha$ is the first alpha mask, I is the first video frame, a is the first primary coefficient, and b is the first secondary coefficient, within a window w centered at pixel k with radius r.

7. The method of claim 1, wherein the plurality of video frames includes a third video frame, the method comprising:
estimating a second primary coefficient and a second secondary coefficient based on the second video frame and the second alpha mask; and
generating a third alpha mask for the third video frame based on the second primary coefficient and the second secondary coefficient.

8. The method of claim 7, wherein the plurality of video frames includes a fourth video frame, the method comprising:
estimating a third primary coefficient and a third secondary coefficient based on a second keyframe alpha mask and the third video frame; and
generating a fourth alpha mask for the fourth video frame based on the third primary coefficient and third secondary coefficient.

9. The method of claim 8, wherein generating the fourth alpha mask comprises updating the third primary coefficient and the third secondary coefficient to the fourth video frame.

10. The method of claim 8, wherein the method comprises estimating a second keyframe primary coefficient and a second keyframe secondary coefficient based on the second keyframe alpha mask, where the second keyframe alpha mask is calculated concurrently with the generation of the second alpha mask and/or the third alpha mask.

11. The method of claim 8, wherein the method comprises estimating a temporary fourth primary coefficient and a temporary fourth secondary coefficient based on the fourth alpha mask and the fourth video frame; and
   wherein generating the fourth alpha mask comprises using Kalman filtering to combine the temporary fourth primary coefficient and the temporary fourth secondary coefficient with the fourth primary coefficient and the fourth secondary coefficient to generate the fourth alpha mask.

12. An electronic device for generating alpha masks of video frames in a video, the electronic device comprising:
   a camera configured to provide the video comprising a plurality of video frames including a first video frame and a second video frame following the first video frame;
   a display configured to display the video frames of the video; and
   a processing unit configured to:
      obtain a first alpha mask of the first video frame;
      estimate a first primary coefficient and a first secondary coefficient based on the first video frame and the first alpha mask, wherein the first alpha mask is, within a window of the first video frame, a linear function of the first video frame and wherein the first primary coefficient and the first secondary coefficient are coefficients of the linear function; and
      generate a second alpha mask for the second video frame based on the first primary coefficient and the first secondary coefficient.

13. The electronic device of claim 12, wherein estimating the first primary coefficient and the first secondary coefficient comprising convolution operations.

14. The electronic device of claim 12, wherein the first alpha mask is defined by:

$$\alpha_i^{(t)} = a_k^{(t)} I_i^{(t)} + b_k^{(t)}$$

wherein $\alpha$ is the first alpha mask, I is the first video frame, a is the first primary coefficient, and b is the first secondary coefficient, within a window w centered at pixel k with radius r.

15. The electronic device of claim 12, wherein the plurality of video frames includes a third video frame, the processing unit further configured to:
   estimate a second primary coefficient and a second secondary coefficient based on the second video frame and the second alpha mask; and
   generate a third alpha mask for the third video frame based on the second primary coefficient and the second secondary coefficient.

16. The electronic device of claim 15, wherein the plurality of video frames includes a fourth video frame, the processing unit further configured to:
   provide a third video frame, wherein the third video frame is a lower resolution version of the third video frame;
   estimate a third primary coefficient and a third secondary coefficient based on a second keyframe alpha mask and the third video frame; and
   generate a fourth alpha mask for the fourth video frame based on the third primary coefficient and third secondary coefficient.

17. The electronic device of claim 16, wherein the processing unit is configured to generate the fourth alpha mask by updating the third primary coefficient and the third secondary coefficient to the fourth video frame.

18. The electronic device of claim 16, wherein the processing unit is configured to estimate a second keyframe primary coefficient and a second keyframe secondary coefficient based on the second keyframe alpha mask, where the second keyframe alpha mask is calculated concurrently with the generation of the second alpha mask and/or the third alpha mask.

19. The electronic device of claim 16, wherein the processing unit is configured to estimate a temporary fourth primary coefficient and a temporary fourth secondary coefficient based on the fourth alpha mask and the fourth video frame; and
   wherein the processing unit is configured to generate the fourth alpha mask using Kalman filtering to combine the temporary fourth primary coefficient and the temporary fourth secondary coefficient with the fourth primary coefficient and the fourth secondary coefficient to generate the fourth alpha mask.

20. A non-transitory computer-readable medium having instructions encoded thereon which, when executed by a processing unit of an electronic device, cause the electronic device to generate alpha masks of video frames in a video comprising a plurality of video frames including a first video frame and a second video frame following the first video frame by:
   obtaining a first alpha mask of the first video frame;
   estimating a first primary coefficient and a first secondary coefficient based on the first video frame and the first alpha mask, wherein the first alpha mask is, within a window of the first video frame, a linear function of the first video frame and wherein the first primary coefficient and the first secondary coefficient are coefficients of the linear function;
   generating a second alpha mask for the second video frame based on the first primary coefficient and the first secondary coefficient.

* * * * *